US006810202B2

United States Patent
Hsu et al.

(12) United States Patent
(10) Patent No.: US 6,810,202 B2
(45) Date of Patent: Oct. 26, 2004

(54) APPARATUS FOR CONTROLLING ROTATIONAL SPEED OF MOTOR

(75) Inventors: Chia-Chang Hsu, Hsinchu (TW); Chung-Hsien Lin, Taipei (TW)

(73) Assignee: Prolific Technology, Inc., Taipei (TW)

( * ) Notice: Subject to any disclaimer, the term of this patent is extended or adjusted under 35 U.S.C. 154(b) by 108 days.

(21) Appl. No.: 10/243,931

(22) Filed: Sep. 16, 2002

(65) Prior Publication Data

US 2004/0052510 A1 Mar. 18, 2004

(51) Int. Cl.$^7$ .............................................. H02P 5/00
(52) U.S. Cl. ..................... 388/800; 388/804; 388/809; 388/811; 388/819; 388/915; 388/934; 318/471; 318/472; 318/473; 318/254; 318/599
(58) Field of Search ............................. 388/800, 804, 388/809, 811, 819, 915, 934; 318/471, 472, 473, 254, 599

(56) References Cited

U.S. PATENT DOCUMENTS

| 5,093,891 | A | * | 3/1992 | Komiyama et al. ......... 388/813 |
| 5,197,858 | A | * | 3/1993 | Cheng ........................ 417/14 |
| 5,407,525 | A | * | 4/1995 | Michel et al. ................ 216/59 |
| 5,457,766 | A | * | 10/1995 | Ko .............................. 388/831 |
| 5,831,405 | A | * | 11/1998 | Massie ....................... 318/471 |
| 5,942,866 | A | * | 8/1999 | Hsieh ......................... 318/268 |
| 6,040,668 | A | * | 3/2000 | Huynh et al. .............. 318/471 |
| 6,252,209 | B1 | * | 6/2001 | Liepold ....................... 219/501 |
| 6,396,231 | B1 | * | 5/2002 | Horng et al. .............. 318/471 |
| 6,617,815 | B1 | * | 9/2003 | Krief ......................... 318/471 |

FOREIGN PATENT DOCUMENTS

TW 154952 3/1991

* cited by examiner

Primary Examiner—Rina Duda
(74) Attorney, Agent, or Firm—Rabin & Berdo, P.C.

(57) ABSTRACT

An apparatus for controlling a rotational speed of a motor, coupled to a sensing unit capable of outputting a sensing signal. The apparatus includes a controlling unit, coupled to the sensing unit, for outputting a controlling signal according to the sensing signal and independently of the rotational speed of the motor. The controlling signal is a square wave and has a duty ratio that is determined by the sensing signal. The apparatus also includes a driving unit, coupled to the controlling unit, for outputting a driving signal to a motor rotor according to the duty ratio of the controlling signal. The driving signal also is a square wave. The rotational speed of the motor rotor is determined by the duty ratio of the driving signal.

31 Claims, 3 Drawing Sheets

APPARATUS FOR CONTROLLING ROTATIONAL SPEED OF MOTOR

This application incorporates by reference Taiwan application Serial No. 090212848, filed Jul. 27, 2001.

BACKGROUND OF THE INVENTION

1. Field of the Invention

This invention relates in general to a controlling apparatus. More specifically, the invention relates to an apparatus for controlling a rotational speed of a motor.

2. Description of Related Art

With the high technological progress and development in the computer industry, precise electronic products, such as the notebook computer, the scanner and the power supply, are widely used. In order to satisfy users' requirements for convenience and efficiency, it becomes a key issue for all makers to make products that have reduced volume becomes and higher operational speed. The key point as to whether the compact electronic products can have maximum efficiency depends on whether the heat generated by the electronic devices in the product can be quickly dissipated. When the heat cannot be efficiently dissipated in time and sinks into the products, the temperature inside the products will increase, causing that the electronic devices in the products not to function normally. As a result, the efficiency of the product is affected, or even the product may malfunction or break down. In order to dissipate the heat quickly, the maker usually assembles a fan in its products to serve as a heat dissipation device, so that the electronic products can work in a proper environment. Because the fan is driven by a DC motor, the rotational condition of the motor will affect the rotational speed of the fan, and therefore affect the heat dissipation effect.

FIG. 1 shows a block diagram of a conventional controlling apparatus for a brushless DC motor. The conventional controlling apparatus for the motor is composed of a controlling unit 102 and a driving unit 104. The controlling unit 102 outputs a controlling signal to the driving unit 104, in which the controlling signal is a DC voltage signal. In a DC motor controlling apparatus capable of controlling its fan speed, the controlling unit 102 is in fact a linear regulator that receives a fixed DC voltage signal and then outputs the controlling signal. The voltage value depends on the temperature at which the electronic device operates currently. The driving unit 104 is a power amplifier equivalently, and can output a DC voltage driving signal with a fixed value, thereby to control the motor rotor to rotate at a fixed rotational speed. It should be noted that the rotational speed of the motor is controlled by the voltage value of the controlling signal output from the controlling unit 102. Therefore, by controlling the voltage value of the controlling signal output from the controlling unit 102, the rotational speed of the fan can be controlled so as to have the best heat dissipation.

The conventional controlling apparatus for the motor has the following shortcomings. First, some problems occur easily in manufacturing the conventional controlling apparatus, for example, deviations of mechanism assemble, shape variations of the coil, washer deformation, or bad lubrication of bearings, etc. Therefore, different motors have deviations in structure. When the driving unit drives the motor according to the same DC voltage controlling signal output from the controlling unit, different motors will have different rotational speeds. Accordingly, the corresponding relationships between the rotational speed of the motor and the DC voltage controlling signal from the driving unit are different among different motors. As a result, the products have to be tested, adjusted or selected eliminate products that do not meet the preset specifications, causing waste in manufacturing cost and time.

In addition, as described above, the value of the voltage signal from the controlling unit depends on the rotational speed of the motor. When the motor operates at full speed, the voltage value of the controlling signal output from the controlling unit is equal to the received voltage signal. However, when the motor does not need to operate at full speed, the voltage value of the controlling signal output from the controlling unit is less than the received voltage signal. At this time, additional energy will be consumed in the form of heat, so as to reduce the dissipation effect of the heat dissipation device.

SUMMARY OF THE INVENTION

To overcome problems presented the foregoing description, an object of this invention is to provide an apparatus for controlling the rotational speed of the motor, by which wastes of time and cost in selecting products can be reduced, and the energy waste when the motor does not operate at full speed can be reduced.

To achieve the above objects, the invention provides an apparatus for controlling the rotational speed of a motor to control the rotational speed of a motor rotor, and additionally, the apparatus is coupled to a sensing unit. The apparatus comprises a controlling unit, coupled to the sensing unit, for outputting a controlling signal according to the sensing signal, wherein the controlling signal is a square wave and has a duty ratio that is determined by the sensing signal; and a driving unit, coupled to the controlling unit, for outputting a driving signal to a motor rotor according to the duty ratio of the controlling signal, wherein the driving signal is a square wave, and the rotational speed of the motor rotor is determined by the duty ratio of the driving signal.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

The invention is characterized by the controlling unit using the pulse width modulation to generate a square wave controlling signal. The driving unit outputs a driving signal to control the rotational speed of the motor based on the duty ratio of the square wave.

Figure 1:
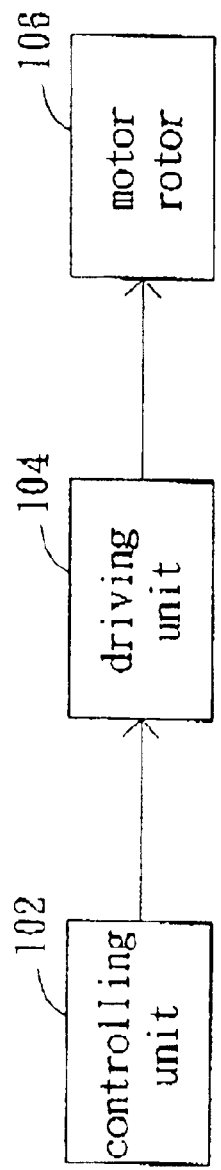
FIG. 1 shows a block diagram of a conventional controlling apparatus for a brushless DC motor.
Figure 2:
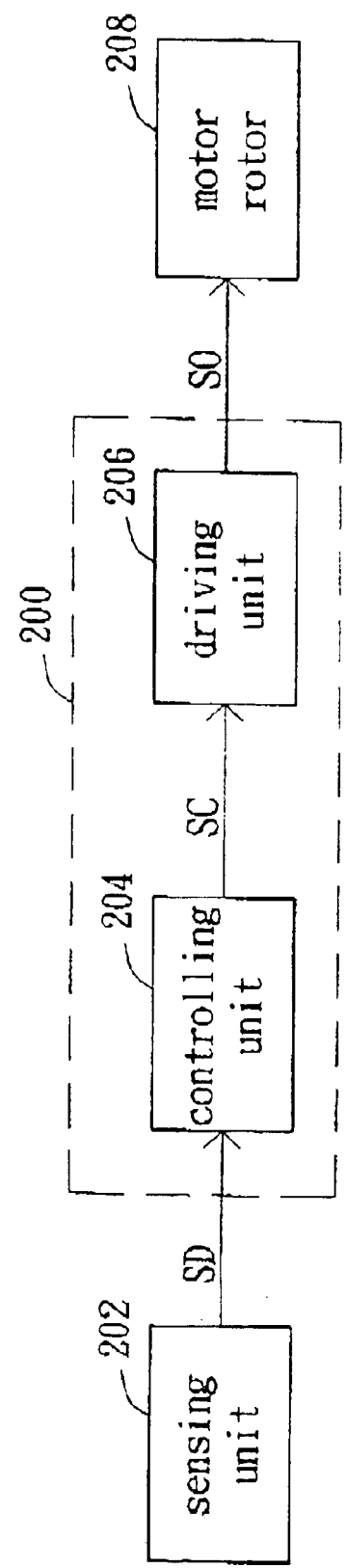
FIG. 2 schematically shows a block diagram of an apparatus 200 for controlling the rotational speed of the motor according to one embodiment of the invention.

FIG. 2 schematically shows a block diagram of an apparatus 200 for controlling the rotational speed of the motor according to one embodiment of the invention. Referring to FIG. 2, the controlling apparatus 200 is coupled to a senor unit 202. The sensor unit 202 can be a thermosensitive element whose characteristic varies in accordance with the temperature corresponding its residential place, for example, a thermal resistor with a negative temperature coefficient (NTC) or a transistor. By properly placing the sensor unit 202 and connecting it to the controlling apparatus 200, the sensor unit 202 can output a sensing signal SD to the controlling apparatus 200 according to a current operational temperature. The sensing signal SD output from the sensor unit 202 is a DC voltage signal whose magnitude depends on the temperature of the operational environment. When the temperature becomes higher, the voltage level of the sensing signal SD becomes larger, and reversely, as the temperature gets lower, the voltage level of the sensing signal SD becomes smaller.

The controlling apparatus 200 comprises a controlling unit 204 and a driving unit 206. The controlling unit is coupled to the sensor unit 202, and can output a controlling signal SC according to the sensing signal SD output from the sensor unit 202.

Figure 3A:
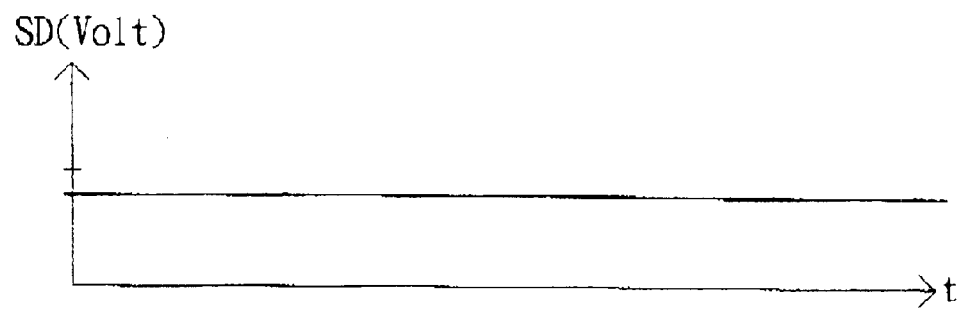
FIG. 3A shows a timing diagram of the sensing signal sd.
Figure 3B:
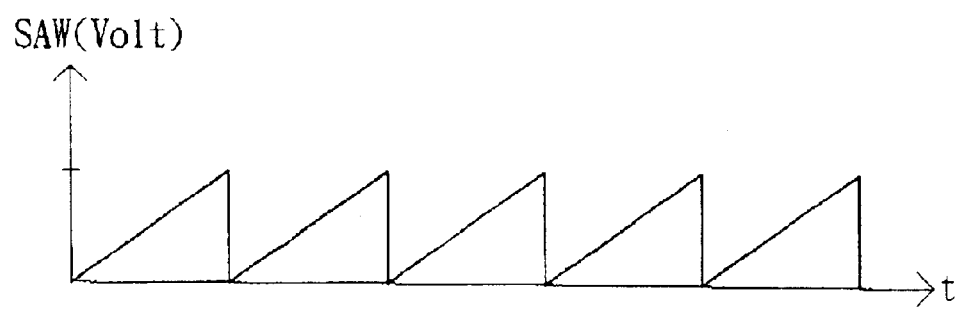
FIG. 3B shows a timing diagram of the saw-tooth wave voltage signal SAW generated by the controlling unit 204.
Figure 3C:
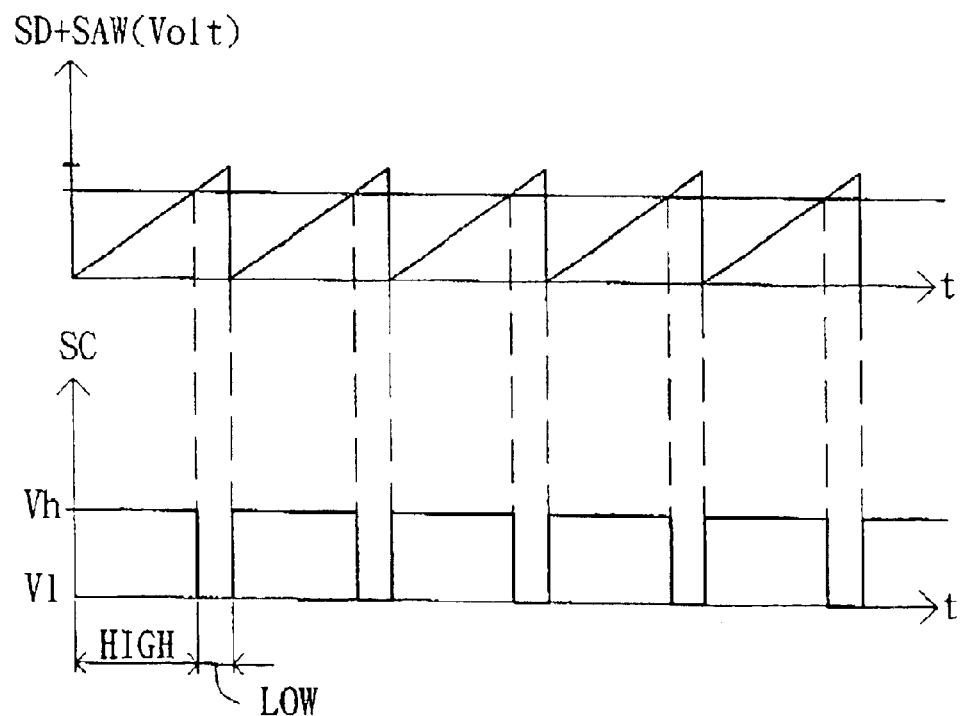
FIG. 3C shows a timing diagram of the controlling signal SC generated by the controlling unit 204 by using pulse width modulation.

FIGS. 3A~3C show timing diagrams of the controlling signal SC generated by the controlling unit 204 by using pulse width modulation. In addition to receiving the sensing signal SD in FIG. 3A, the controlling unit 204 also generates internally a saw-tooth wave voltage signal SAW with a regular waveform, period and voltage, as shown in FIG. 3B. Additionally, by comparing the sensing signal SD (DC voltage) with the saw-tooth wave voltage signal SAW, the controlling unit 204 outputs a high level signal Vh when the sensing signal SD (DC voltage) is greater than the saw-tooth wave voltage signal SAW. In contrast, the controlling unit 204 outputs a low level signal Vl when the sensing signal SD (DC voltage) is less than the saw-tooth wave voltage signal SAW, as shown in FIG. 3C. The controlling signal SC output from the controlling unit 204 is a square wave signal, and the ratio of the high level signal Vh to the low level signal Vl, which is the duty ratio of the square wave, depends on the relative voltage values of the sensing signal SD and the saw-tooth wave voltage signal SAW.

As described above, the voltage value of the sensing signal depends on the current operational environment. In addition, the waveform, the period and the voltage are fixed. Therefore, the current operational temperature will affect the DC value of the sensing signal SD so as to affect the duty ratio of the square wave controlling signal SC output from the controlling unit 204. This signal modulating mechanism is the so-called pulse width modulation (PWM), and the square wave controlling signal SC output from the controlling unit 204 is a PWM signal.

The controlling unit 204 outputs the controlling signal SC to the driving unit 206, and then the driving unit 206 can output a driving signal SO based on the duty ratio of square wave controlling signal SC to control the rotational speed of the motor rotor 208. As indicated by the foregoing description, the driving signal SO output from the driving unit 206 is also a square wave. When the duty ratio of the driving sign SO becomes larger, the driving unit 206 can control the motor rotor 208 to rotate with a higher rotational speed. When the duty ratio of the driving signal SO gets smaller, the driving unit 206 can control the motor rotor 208 to rotate with a lower rotational speed.

In addition to the controlling signal SC output from the controlling unit 204 being a PWM signal produced by the PWM method, the controlling signal SC output from the controlling unit 204 can be another controlling signal SC' having another waveform produced by a digital method. The control apparatus 200 presets a critical value built in the controlling unit 204 according to a tolerable temperature range of working environment for electronic devices. From the PWM principle above, when the duty ratio of the PWM square wave signal obtained by the PWM is greater than the critical value, the current operational temperature is higher than the tolerable temperature for the electronic device. Therefore, the controlling unit 204 then outputs a controlling signal SC' of a low level (Vl) to the driving unit 206. The driving unit 206 outputs the driving signal SO according to the controlling signal SC' to control the motor to rotate at a lower rotational speed. When the duty ratio of the PWM square wave signal obtained by the PWM is less than the critical value, the current operational temperature is lower than the tolerable temperature for the electronic device. Therefore, the controlling unit 204 then outputs a controlling signal SC' of high level (Vh) to the driving unit 206. The driving unit 206 outputs the driving signal SO' according to the controlling signal SC' to control the motor to rotate at a higher rotational speed.

Figure 4:
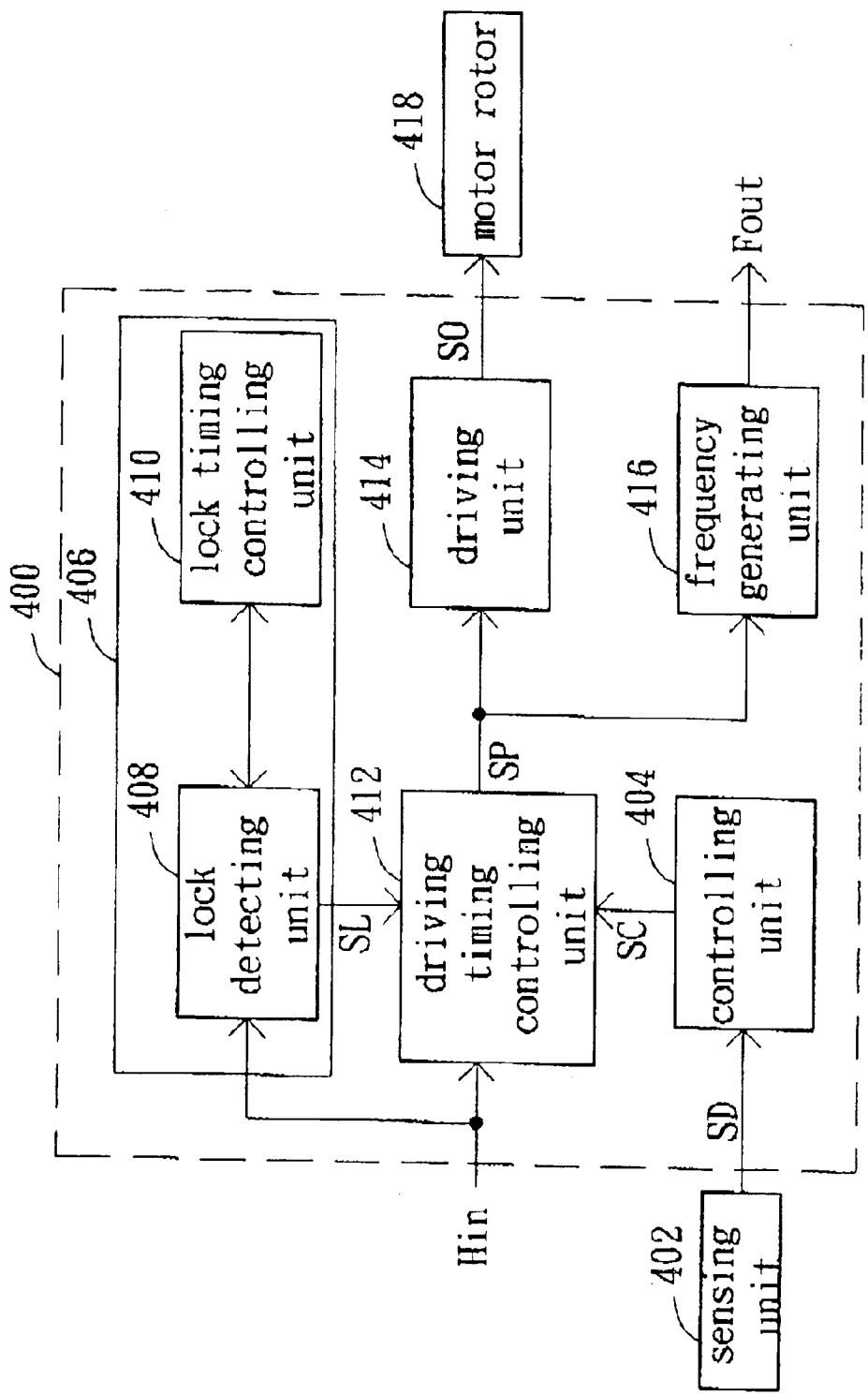
FIG. 4 schematically shows a block diagram of an apparatus 400 for controlling the rotational speed of the motor according to one embodiment of the invention.

FIG. 4 schematically shows a block diagram of an apparatus 400 for controlling the rotational speed of the motor according to one embodiment of the invention. Referring to FIG. 4, the apparatus for controlling the rotational speed of the motor of the invention can further incorporate a lock protection unit 406 and a frequency generator 416 to form a more powerful apparatus for controlling the rotational speed of the motor. The lock protection unit 406 is used for preventing the motor rotor 418 from working abnormally due to improper external factors. During the actual operation, the motor rotor 418 may be locked because the shaft of the fan may be jammed with dust or foreign articles. At this time, if the controlling apparatus 400 keeps the motor rotor 418 in operation continuously, the motor rotor 418 is perhaps locked and becomes overheat so as to damage the mechanical structure. Therefore, the lock protection 406 is required for preventing the above issue from occurring.

The lock protection unit 406 comprises a lock detecting unit 408 and a lock timing controlling unit 410. The lock detecting unit 408 determines whether the motor rotor 418 is locked according to a received rotational speed signal Hin, and then outputs a lock protection signal SL. The rotational speed signal Hin is used for representing the rotational speed of the motor, and therefore can be used for detecting whether the motor is locked. The rotational speed signal Hin will be discussed in detail in following paragraphs.

It should be noted that there are two kinds of the lock protection signals SL: the first lock protection signal SL1 and the second lock protection signal SL2. When the motor rotor 418 is not locked, the lock detecting unit 408 outputs the first lock protection signal SL1, and when the motor rotor 418 is locked, the lock detecting unit 408 outputs the second lock protection signal SL2.

Referring to FIG. 4 again, the sensing signal SD and the rotational speed signal Hin are respectively input to the controlling unit 404 and the lock protection unit 406. The controlling unit 404 outputs the controlling signal SC by using the PWM and the lock protection unit 406 outputs the lock protection signal SL by determining whether the motor is locked. The controlling signal SC and the lock protection signal SL are input to a driving timing controlling unit 412. The driving timing controlling unit 412 outputs a driving timing signal SP according to the controlling signal SC and the lock protection signal SL. There are two kinds of the driving timing signal SP: the first driving timing signal SP1 and the second driving timing signal SP2. When the driving timing controlling unit 412 receives the first driving timing signal SP1, the motor rotor 418 is not locked. At this time, the driving timing controlling unit 412 outputs the first driving timing signal SP1 to the driving unit 414 according to the controlling signal SC. When the driving timing controlling unit 412 receives the second driving timing signal SP2, the motor rotor 418 is locked. At this time, the driving timing controlling unit 412 outputs the second driving timing signal SP2 to the driving unit 414

The first driving timing signal SP1 is a square wave. When the driving unit 414 receives the first driving timing signal SP1, the driving unit 414 outputs a first driving signal SO1 according to the duty ratio of the square wave so as to control the rotational speed of the motor rotor 418. The second driving timing signal SP2 is a DC voltage signal. When the driving unit 414 receives the second driving timing signal SP2, the driving unit 414 outputs a second driving signal SO2 according to the second driving timing signal SP2 to stop the motor rotor for a certain time. The time that the motor stops its operation is determined by a lock timing controlling unit 410. After the motor has stopped for the certain time, the motor is driven to restart and a determination is made as to whether the motor is locked according to the rotational speed signal Hin. By repeating the above process, the motor can be prevented from being locked.

The driving timing controlling unit 412 outputs the driving timing signal SP to the driving unit 414, and additionally to the frequency generator 416. The frequency generator 416 outputs a frequency generating signal out according to the driving timing signal SP. The frequency generating signal Fut can be input to an external circuit, such as a Hall sensor, for generating the rotational speed signal Hin. The rotational speed signal is used for representing the current rotational speed of the motor.

The apparatus 400 for controlling the rotational speed of the motor can be composed of discrete circuit elements, or designed as an integral circuit for assembly into a precise electronic products, such as a central processing unit (CPU) inside a notebook computer or a desktop computer, to control its equipped fan, by which the fan can be operated with a proper rotational speed to achieve an optimum heat dissipation.

Advantageously, the apparatus for controlling the rotational speed of the motor according to the invention has following effects. First, wastes of time and cost due to selecting products can be reduced. The controlling apparatus of the invention is based on the sensing signal output from the sensing unit. In other words, the rotational speed of the motor is determined according to the temperature of the operational environment of the motor. Therefore, no matter the differences in the specification or in the structure of the motor, the motor controlling apparatus of the invention can perform the best heat dissipation. Accordingly, after the products are manufactured, no rigorous tests and selections are required and the wastes of time or cost can be reduced.

The energy waste when the motor does not operate at full speed can be reduced. The invention utilizes the PWM to output a square wave controlling signal and then uses the duty ratio of the square wave to control the rotational speed of the motor, thereby to improve the conventional method of controlling the rotational speed of the motor by using DC voltage signal. When the motor does not need to be operated at full speed, the controlling signal output from the controlling unit is still a square wave, by which the energy waste due to the controlling unit outputting the controlling signal can be reduced. In addition, the heat dissipation of the controlling apparatus of the motor rotational speed can be improved.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An apparatus for controlling a rotational speed of a motor, coupled to a sensing unit capable of outputting a sensing signal, the apparatus comprising:

an open loop-controlling unit, coupled to the sensing unit, for outputting a controlling signal (SC) according to the sensing signal and independently of the rotational speed of the motor, wherein the controlling signal is a square wave and has a duty ratio that is determined by the sensing signal; and a driving unit, coupled to the controlling unit, for outputting a driving signal to a motor rotor according to the duty ratio of the controlling signal, wherein the driving signal is a square wave, and the rotational speed of the motor rotor is determined by the duty ratio of the driving signal.

2. The apparatus of claim 1, wherein the sensing signal is a DC voltage signal, and the magnitude of the DC voltage signal is determined by a temperature currently detected by the sensing unit.

3. The apparatus of claim 2, wherein the controlling unit uses a pulse width modulation (PWM) to generate and output the controlling signal according to the sensing signal.

4. An apparatus for controlling a rotational speed of a motor, coupled to a sensing unit capable of outputting a sensing signal, the apparatus comprising:

an open loop controlling unit, coupled to the sensing unit, for outputting a controlling signal according to the sensing signal and independently of the rotational speed of the motor, wherein the controlling signal is a first controlling signal or a second controlling signal; and a driving unit, coupled to the controlling unit, for outputting a driving signal to a motor rotor according to the duty ratio of the controlling signal, wherein the driving signal is a first driving signal or a second driving signal; the driving unit outputs the first driving signal when receiving the first controlling signal, and outputs the second driving signal when receiving the second controlling signal;

wherein the motor rotor has a first rotational speed and a second rotational speed, and the motor rotor rotates at the first rotational speed when receiving the first driving signal, and rotates at the second rotational speed when receiving the second driving signal.

5. The apparatus of claim 4, wherein the sensing signal is a DC voltage signal, and the magnitude of the DC voltage signal is determined by a temperature currently detected by the sensing unit.

6. The apparatus of claim 4, wherein the controlling unit generates a PWM signal according to the sensing signal, and determines the output controlling signal is the first controlling signal or the second controlling signal according to the PWM signal.

7. The apparatus of claim 6, wherein the PWM signal is a square wave, the controlling unit presets a critical value; when the duty ratio of the PWM signal is greater than the critical value, the controlling unit outputs the first controlling signal; when duty ratio of the PWM signal is less than the critical value, the controlling unit outputs the second controlling signal.

8. The apparatus of claim 4, wherein the first driving signal is a high level voltage signal, and the second driving signal is a low level voltage signal.

9. The apparatus of claim 4, wherein the first rotational speed is greater than the second rotational speed.

10. An apparatus for controlling a rotational speed of a motor, coupled to a sensing unit capable of outputting a sensing signal, the apparatus comprising:

an open loop controlling unit, coupled to the sensing unit, for outputting a controlling signal according to the sensing signal and independently of the speed of the motor, wherein the controlling signal is a square wave and has a duty ratio that is determined by the sensing signal;

a lock protection unit, for outputting a lock protection signal according to whether a motor rotor is locked by external factors, and then determining a lock period;

a driving timing controlling unit, coupled to the controlling unit and the lock protection unit respectively, for outputting a driving timing signal according to the controlling signal and the lock protection signal; and a driving unit, coupled to the controlling unit, for outputting a driving signal to the motor rotor according to the driving timing signal.

11. The apparatus of claim 10, wherein the sensing signal is a DC voltage signal, and the magnitude of the DC voltage signal is determined by a temperature currently detected by the sensing unit.

12. The apparatus of claim 10, wherein the controlling unit uses a pulse width modulation (PWM) to generate and output the controlling signal according to the sensing signal.

13. The apparatus of claim 10, wherein the lock protection unit further comprises:

a lock detecting unit, for determining whether the motor rotor is locked, and then outputting the lock protection signal; and a lock timing controlling unit, coupled to the lock detecting unit, for determining the lock period.

14. The apparatus of claim 13, wherein the lock protection signal is a first lock protection signal or a second lock protection signal; when the motor is not locked, the first lock protection signal is output; and when the motor is locked, the second lock protection signal is output.

15. The apparatus of claim 10, wherein the driving timing signal is a first driving timing signal or a second driving timing signal; the driving timing controlling unit outputting the first driving timing signal according to the controlling signal when receiving the first lock protection signal, and outputting the second driving timing signal when receiving the second lock protection signal.

16. The apparatus of claim 15, wherein the driving signal is a first driving signal or a second driving signal; the driving unit outputting the first driving signal when receiving the first driving timing signal, and outputting second driving signal when receiving the second driving timing signal.

17. The apparatus of claim 16, wherein the first driving timing signal is a square wave signal, and the driving unit outputs the first driving signal to control the rotational speed of the motor rotor according to the duty ratio of the square wave.

18. The apparatus of claim 16, wherein the second driving timing signal is a DC voltage signal, and the driving unit outputs the second driving signal to stop the motor rotor according to the second driving timing signal.

19. The apparatus of claim 15, wherein time when the driving timing controlling outputs the second driving timing signal is determined by the lock period.

20. The apparatus of claim 10, further comprising a frequency generator, for outputting a frequency generating signal to represent the rotational speed of the motor rotor.

21. An apparatus for controlling a rotational speed of a motor, coupled to a sensing unit capable of outputting a sensing signal, the apparatus comprising:

an open loop controlling unit, coupled to the sensing unit, for outputting a controlling signal according to the sensing signal and independently of the rotational speed of the motor, wherein the controlling signal is a first controlling signal or a second controlling signal;

a lock protection unit, for outputting a lock protection signal according to whether a motor rotor is locked by external factors, and then determining a lock period;

a driving timing controlling unit, coupled to the controlling unit and the lock protection unit respectively, for outputting a driving timing signal according to the controlling signal and the lock protection signal, wherein the driving timing signal is a first driving timing signal or a second driving timing signal; and a driving unit, coupled to the controlling unit, for outputting a driving signal to the motor rotor according to the driving timing signal, wherein the driving signal is a first driving signal or a second driving signal; the driving unit outputting the first driving signal when receiving the first driving timing signal, and outputting second driving signal when receiving the second driving timing signal;

wherein the motor rotor has a first rotational speed and a second rotational speed, and the motor rotor rotates at the first rotational speed when receiving the first driving signal, and rotates at the second rotational speed when receiving the second driving signal.

22. The apparatus of claim 21, wherein the sensing signal is a DC voltage signal, and the magnitude of the DC voltage signal is determined by a temperature currently detected by the sensing unit.

23. The apparatus of claim 21, wherein the controlling unit generates a PWM signal according to the sensing signal, and determines the output controlling signal is the first controlling signal or the second controlling signal according to the PWM signal.

24. The apparatus of claim 21, wherein the PWM signal is a square wave, and the controlling unit presets a critical value;

wherein when the duty ratio of the PWM signal is greater than the critical value, the controlling unit outputs the first controlling signal; and wherein when duty ratio of the PWM signal is less than the critical value, the controlling unit outputs the second controlling signal.

25. The apparatus of claim 21, wherein the lock protection signal is a first lock protection signal or a second lock protection signal;

wherein when the motor is not locked, the first lock protection signal is output; and wherein when the motor is locked, the second lock protection signal is output.

26. The apparatus of claim 21, wherein the driving timing signal is a first driving timing signal or a second driving timing signal; the driving timing controlling unit outputting the first driving timing signal when receiving the first lock protection signal and the first controlling signal, and outputting the second driving timing signal when receiving the second lock protection signal.

27. The apparatus of claim 21, wherein the driving unit outputs the first driving signal when receiving the first driving timing signal, and outputs second driving signal when receiving the second driving timing signal.

28. The apparatus of claim 26, wherein the first driving timing signal is a square wave signal, and the driving unit outputs the first driving signal to control the rotational speed of the motor rotor according to the duty ratio of the square wave.

29. The apparatus of claim 26, wherein the second driving timing signal is a DC voltage signal, and the driving unit outputs the second driving signal to stop the motor rotor according to the second driving timing signal.

30. The apparatus of claim 26, wherein time when the driving timing controlling outputs the second driving timing signal is determined by the lock period.

31. The apparatus of claim 21, further comprising a frequency generator, for outputting a frequency generating signal to represent the rotational speed of the motor rotor.

* * * * *